United States Patent Office 3,647,820
Patented Mar. 7, 1972

3,647,820
2-POSITION KETALS OF A-NORANDROSTANES AND DERIVATIVES THEREOF
Seymour D. Levine, North Brunswick, and Patrick A. Diassi, Westfield, N.J., assignors to E. R. Squibb & Sons, Inc., New York, N.Y.
No Drawing. Continuation-in-part of application Ser. No. 792,235, Jan. 16, 1969, which is a division of application Ser. No. 621,755, Mar. 9, 1967, now Patent No. 3,468,955, which in turn is a division of application Ser. No. 440,311, Mar. 16, 1965, now Patent No. 3,330,851.
This application Apr. 13, 1970, Ser. No. 28,046
Int. Cl. C07d 13/04
U.S. Cl. 260—340.9      9 Claims

ABSTRACT OF THE DISCLOSURE

This invention relates to new 2-ketal derivatives of A-norandrostane which are useful in the preparation of cyano-containing androstanes having fertility inhibiting activity.

---

This application is a continuation-in-part of copending application Ser. No. 792,235, filed Jan. 16, 1969, now abandoned which application is a division of application Ser. No. 621,755 filed Mar. 9, 1967, now U.S. Pat. No. 3,468,955, which is a division of application Ser. No. 440,311, filed Mar. 16, 1965, now U.S. Pat. No. 3,330,851.

This invention relates to new steroidal compounds and, more particularly, to new steroids of the A-norandrostane series, new intermediates useful in the preparation of the same, and processes for preparing the same.

The new final products of this invention are of the Formula I:

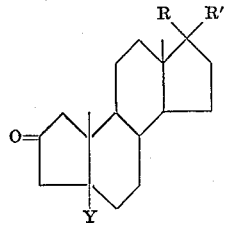

wherein Y is β-hydrogen or β-cyano; R is hydroxy or acyloxy; and R' is vinyl, ethynyl, halo substituted vinyl, trifluoromethyl substituted vinyl, halo substituted ethynyl and trifluoromethyl substituted ethynyl. Among the suitable acyloxys may be mentioned the acyloxy radical of a hydrocarbon carboxylic acid of less than twelve carbon atoms, as exemplified by the lower alkanoic acids (e.g., acetic, propionic, butyric, hexanoic and enanthic acid), the lower alkenoic acids, the cycloalkane carboxylic acids, the cycloalkene carboxylic acids, the monocyclic aromatic carboxylic acids (e.g., benzoic acid), and the monocyclic aryllower alkanoic acid (e.g., phenacetic and β-phenylpropionic acid). Among the suitable halogen substituted vinyls may be mentioned perhalovinyls, such as trifluorovinyl, trichlorovinyl, 1,2-difluoro-2-chlorovinyl and 1,2-difluoro-2-bromovinyl; the dihalovinyls, such as 1,2-difluorovinyl, 2,2-difluorovinyl, 1-chloro-2-fluorovinyl, 1-bromo-2-fluorovinyl, and 1,2-dichlorovinyl; and the monohalovinyls, such as 1-fluorovinyl, 2-fluorovinyl, 1-chlorovinyl, 2-chlorovinyl, and 1-bromovinyl. Among the suitable halogen substituted ethynyls may be mentioned fluoroethynyl, chloroethynyl and bromoethylnyl.

The final products of this invention are physiologically active compounds that possess fertility inhibiting activity. Hence, they may be administered orally or parenterally in lieu of known anti-fertility agents, such as progestagens and estrogens for control of conception, the dose being adjusted for the activity of the particular compound.

The compounds of this invention are prepared by interacting a compound of the Formula II:

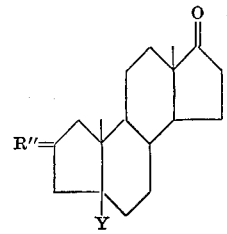

wherein Y is as hereinbefore defined and R'' is keto or ketal, with a compound of the formula: R'X, wherein R' is as hereinbefore defined, and X is an activating group such as magnesium bromide, lithium or a complex thereof (e.g., a lithium ethylenediamine complex). When Y is cyano, a 2-ketal (R'' is ketal) must be used. When Y is hydrogen, either a 2-ketal or 2-ketone may be used as the reactant. Although any ketal may be used, the preferred ketals are those with alkanediols, such as ethylene glycol and propylene glycol. To complete the reaction, water is then added, thereby yielding products of the Formula III:

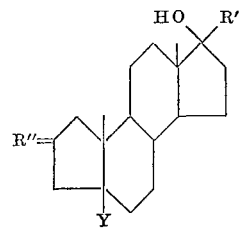

wherein Y, R' and R'' are as hereinbefore defined.

If the compound of Formula III formed contains a 2-ketal group, it may be hydrolyzed, by treatment with an aqueous solution of a strong acid, such as p-toluenesulfonic acid, to yield the corresponding 2-keto derivative. If a 17-ester is desired as the final product, the compound of Formula III, in its free 2-keto form, is reacted with the acyl chloride or acid anhydride of the desired acid, preferably one of the acids mentioned hereinbefore, to yield the 17-ester.

In those instances where ketals of Formula II are used, they may be prepared by first treating either 5β-cyano-A-nortestosterone (prepared as described in U.S. patent application, Ser. No. 355,913, filed Mar. 30, 1964 now U.S. Pat. 3,271,437) or 5β-A-norandrostane-2-one-17β-ol with a ketalizing agent, such as ethylene glycol or propylene glycol, in the presence of a strong acid, such as p-toluenesulfonic acid, to yield the corresponding 2-ketal derivative; and then oxidizing such derivative, as by treatment with chromium oxide, to yield the corresponding 17-keto derivative.

The following examples illustrate the invention (all temperatures being in centigrade):

EXAMPLE 1

17α-ethynyl-5β-cyano-A-norandrostane-2-one-17β-ol 2-ethylene ketal (a) Preparation of 5β-cyano-A-norandrostane-2-one-17β-ol 2-ethylene ketal 17-acetate A mixture of 115 mg. of 5β-cyano-A-nortestosterone and 7 mg. of p-toluenesulfonic acid is stirred and refluxed in 40 ml. of benzene and 3 ml. of ethylene glycol for one day and the water removed by a calcium carbide trap. The reaction mixture is diluted with water and the benzene layer is separated. The aqueous layer is extracted with additional benzene. The combined benzene extracts are washed with 8% salt solution and evaporated to give a residue which is acetylated by refluxing in 2 ml. of acetic anhydride containing 0.2 ml. of pyridine for one hour. The reaction mixture is poured into ice-water and extracted with chloroform. The chloroform extracts are washed with a saturated sodium bicarbonate solution, dried over sodium sulfate and evaporated to dryness. Plate chromatography of the residue on neutral alumina (Activity V) using a mixture of chloroform and hexane (1:2) as the developing solvent gives a major band at about R$f$ 0.35 which is detectable with iodine. Elution with ethyl acetate, evaporation, and crystallization of the residue from isopropyl ether-hexane gives about 75 mg. of 5$\beta$-cyano-A-norandrostane-2-one-17$\beta$-ol 2-ethylene ketal 17-acetate, M.P. about 175–177°. The analytical sample is prepared by recrystallization from isopropyl ether-hexane, M.P. about 182.5–183.5°; $[\alpha]_D^{29}$ +3° (EtOH); $\lambda$KBr 4.50 and 5.77$\mu$; $\tau$Si(CH$_3$)$_4$ 9.20 (s., 18-Me), 8.78 (s., 19-Me), 7.97 (s., 17-acetate), and 6.13 (m., ketal methylenes).

Analysis.—Calc'd for C$_{23}$H$_{33}$O$_4$N (387.50) (percent): C, 71.29; H, 8.58; N, 3.61. Found (percent): C, 71.28; H, 8.59; N, 3.50.

(b) Preparation of 5$\beta$-cyano-A-norandrostane-2-one-17$\beta$-ol 2-ethylene ketal (i) A solution of 100 mg. of 5$\beta$-cyano-A-norandrostane-2-one-17$\beta$-ol 2-ethylene ketal 17-acetate in 1 ml. of 10% aqueous potassium carbonate solution and 10 ml. of methanol is stirred at room temperature for 18.5 hours. The reaction mixture is diluted with water and extracted with chloroform. The chloroform extracts are washed with 8% salt solution, dried over sodium sulfate and evaporated to dryness. Plate chromatography of the residue on neutral alumina (Activity V) using a mixture of chloroform and hexane (2:1) as the developing solvent gives a major band which is detectable with iodine. Elution with ethyl acetate, evaporation, and crystallization of the residue from isopropyl ether gives about 40 mg. of 5$\beta$ - cyano - A - norandrostane - 2 - one - 17$\beta$ - ol 2-ethylene ketal, M.P. about 172–174°. The analytical sample is prepared by recrystallization from isopropyl ether, M.P. about 175.5–176.5°, $[\alpha]_D^{25}$ + 6° (EtOH); $\lambda$KBr 2.85 and 4.50$\mu$; $\tau$Si(CH$_3$)$_4$ 9.26 (s., 18-Me), 8.79 (s., 19-me), 6.12 (mm., ketal methylenes) and 6.38 (m., 17-H).

Analysis.—Calc'd for C$_{21}$H$_{31}$O$_3$N (345.47) (percent): C, 73.00; H, 9.05. Found (percent): C, 72.92; H, 9.01.

(ii) Ketalization of 5$\beta$-cyano-A-nortestosterone as described in Step (i) of this example gives rise to 5$\beta$-cyano-A-norandrostane-12-one-17$\beta$-ol 2-ethylene ketal.

(c) Preparation of 5$\beta$-cyano-A-norandrostane-2,17-dione 2-ethylene ketal

A solution of 50 mg. of 5$\beta$-cyano-A-norandrostane-2-one-17$\beta$-ol 2-ethylene ketal in 2 ml. of acetone is treated dropwise with stirring with an equivalent amount of chromium trioxide-sulfuric acid. The reaction mixture is treated with one drop of pyridine, filtered and diluted with water. The aqueous phase is extracted with ether. The ether extracts are washed with 8% salt solution, dried over sodium sulfate and evaporated to dryness. Crystallization of the residue from chloroform-isopropyl ether gives about 27 mg. of 5$\beta$-cyano-A-norandrostane-2,17-dione 2-ethylene ketal, M.P. about 212.5–213.5°. The analytical sample is prepared by recrystallization from chloroform-isopropyl ether, M.P. about 213.5–214.5°, $[\alpha]_D^{25}$ +73° (EtOH); $\lambda$KBr 4.50 and 5.78$\mu$; $\tau$Si(CH$_3$)$_4$ 9.12 (s., 18-Me), 8.76 (s., 19-Me) and 6.13 (m., ketal methylenes).

Analysis.—Calc'd for C$_{21}$H$_{29}$O$_3$N (343.45) (percent): C, 73.43; H, 8.51; N, 4.08. Found (percent): C, 73.40; H, 8.52; N, 4.32.

(d) Preparation of 17$\alpha$-ethynyl-5$\beta$-cyano-A-norandrostane-2-one-17$\beta$-ol 2-ethylene ketal A mixture of 200 mg. of 5$\beta$-cyano-A-norandrostane-2,17-dione 2-ethylene ketal and 100 mg. of lithium acetylide ethylenediamine complex in 10 ml. of benzene and 10 ml. of tetrahydrofuran under an atmosphere of helium is slowly warmed to 45° over a one hour period and maintained at this temperature for 6 additional hours. The reaction mixture is treated with 5 ml. of water and refluxed for one hour, diluted with water and extracted with chloroform. The chloroform extracts are washed with 8% salt solution, dried over sodium sulfate and evaporated to dryness. Crystallization of the residue from methanol gives 61 mg. of 17$\alpha$-ethynyl-5$\beta$-cyano-A-norandrostane-2-one-17$\beta$-ol 2-ethylene ketal, M.P. about 262–264°. The analytical sample is prepared by recrystallization from methanol-isopropyl ether, M.P. about 269–270°, $[\alpha]_D^{24}$ −32° (EtOH+1 drop pyridine); $\lambda$KBr 2.92, 3.08 and 4.50$\mu$.

Analysis.—Calc'd for C$_{23}$H$_{31}$O$_3$N (369.49) (percent): C, 74.76; H, 8.46. Found (percent): C, 74.65; H, 8.57.

EXAMPLE 2

17$\alpha$-ethynyl-5$\beta$-cyano-A-norandrostane-2-one-17$\beta$-ol

A mixture of 220 mg. of 17$\alpha$-ethynyl-5$\beta$-cyano-A-norandrostane-2-one-17$\beta$-ol 2-ethylene ketal and 25 mg. of p-toluenesulfonic acid in 2 ml. of water and 20 ml. of acetone is refluxed for 22 hours, diluted with water and the acetone evaporated. The aqueous phase is extracted with chloroform. The chloroform extracts are washed with 8% salt solution, dried over sodium sulfate and evaporated to dryness. Plate chromatography of the residue on neutral alumina (Activity V) using chloroform as the developing solvent gives a major band which is detectable with iodine. Elution with ethyl acetate, evaporation, and crystallization of the residue from ethyl acetate-isopropyl ether gives 112 mg. of 17$\alpha$-ethynyl-5$\beta$-cyano-A-norandrostane-2-one-17$\beta$-ol, M.P. about 174–176°. The analytical sample is prepared by recrystallization from ethylacetate-petroleum ether (B.P. 30–75°), M.P. about 181.5–182.5°, $[\alpha]_D^{25}$ −124° (EtOH); $\lambda$KBr 2,93, 3.05, 4.50 and 5.72$\mu$; $\tau$ Si(CH$_3$)$_4$ 9.13 (s., 19-Me), 8.61 (s., 19-Me), and 7.42 (s., 17$\alpha$-ethynyl-H).

Analysis.—Calc'd for C$_{21}$H$_{27}$O$_2$N (325.43) (percent): C, 77.50; H, 8.36. Found (percent): C, 77.59; H, 8.42.

EXAMPLE 3

17$\alpha$-ethynyl-5$\beta$-cyano-A-norandrostane-2-one-17$\beta$-ol acetate

A solution of 0.0033 ml. of perchloric acid in 0.3 ml. of acetic anhydride is added to 500 mg. of 17$\alpha$-ethynyl-5$\beta$-cyano-A-norandrostane-2-one-17$\beta$-ol in 10 ml. of acetic anhydride. The reaction mixture is stirred at room temperature for 30 minutes and then poured into ice-water and extracted with chloroform. The chloroform extracts are washed with a saturated sodium bicarbonate solution, 8% salt solution, dried over sodium sulfate and evaporated to dryness to give 17$\alpha$-ethynyl-5$\beta$-cyano-A-norandrostane-2-one-17$\beta$-ol acetate.

Similarly, by substituting any other acyl chloride or acid anhydride for the acetic anhydride in the procedure of Example 3, the corresponding 17-ester is formed. Thus, propionic anhydride and benzoyl chloride yield the propionate and benzoate, respectively.

EXAMPLE 4

17$\alpha$-trifluoropropynyl-5$\beta$-cyano-A-norandrostane-2-one-17$\beta$-ol 2-ethylene ketal A solution of 150 mg. of 5$\beta$-cyano-A-norandrostane-2,17-dione 2-ethylene ketal in 15 ml. of tetrahydrofuran is treated with an excess of trifluoropropynylmagnesium bromide (prepared from ethyl magnesium bromide and excess trifluoropropyne in tetrahydrofuran solution). The reaction mixture is refluxed for 6 hours, cooled, and then treated with a saturated ammonium chloride solution and the organic layer separated. The aqueous layer is extracted with chloroform. The combined organic fractions are washed with 8% salt solution, dried over sodium sulfate and evaporated to dryness to give 17α-trifluoropropynyl-5β-cyano-A-norandrostane-2-one-17β-ol 2-ethylene ketal.

EXAMPLE 5

17α- and 17β-chloroethynyl-5β-cyano-A-norandrostane-2-one-17-ols 2-ethylene ketal A solution of 250 mg. of 5β-cyano-A-norandrostane-2,17-dione 2-ethylene ketal in 20 ml. of ether is added dropwise to an excess of chloroethynyllithium (prepared from cis-1,2-dichloroethylene and methyllithium in ether) solution over a 10 minute period. The reaction mixture is left at room temperature for 2.5 hours and treated with ice-water and additional ether. The ether layer is separated, washed with 8% salt solution, dried over sodium sulfate and evaporated to dryness to give a mixture of 17α- and 17β-chloroethynyl-5β-cyano-A-norandrostane-2-one-17-ols 2-ethylene ketal which are separable by chromatography on neutral alumina (Activity V).

EXAMPLE 6

17α-trifluorovinyl-5β-cyano-A-norandrostane-2-one-17β-ol 2-ethylene ketal

A solution of 300 mg. of 5β-cyano-A-norandrostane-2,17-dione 2-ethylene ketal in 25 ml. of tetrahydrofuran is treated with an excess of trifluorovinylmagnesium bromide (prepared from magnesium and trifluorobromoethylene in tetrahydrofuran solution). The reaction mixture is refluxed for 6 hours, cooled, and then treated with a saturated ammonium chloride solution and the organic layer separated. The aqueous layer is extracted with chloroform. The combined organic fractions are washed with 8% salt solution, dried over sodium sulfate and evaporated to dryness to give 17α-trifluorovinyl-5β-cyano-A-norandrostane-2-one-17β-ol 2-ethylene ketal.

Similarly, by substituting the indicated magnesium bromide for the trifluorovinylmagnesium bromide in the procedure of Example 6, the indicated 17α-R'-5β-cyano-A-norandrostane-2-one-17β-ol 2-ethylene ketal is formed:

| Example | Reactant | Product R' is: |
| --- | --- | --- |
| 7 | Vinylmagnesium bromide | Vinyl. |
| 8 | β-Chlorovinylmagnesium bromide | β-Chlorovinyl. |
| 9 | α,β-Dichlorovinylmagnesium bromide | α,β-Dichlorovinyl. |
| 10 | α,β-Difluorovinylmagnesium bromide | α,β-Difluorovinyl. |

EXAMPLE 11

17α-trifluoropropynyl-5β-cyano-A-norandrostane-2-one-17β-ol

Following the procedure of Example 2, but substituting 17α-trifluoropropynyl-5β-cyano - A - norandrostane-2-one-17β-ol 2-ethylene ketal for the 17α-ethynyl-5β-cyano - A - norandrostane-2-one-17β-ol 2-ethylene ketal, 17α-trifluoropropynyl-5β-cyano - A - norandrostane-2-one-17β-ol is formed.

Similarly, by substituting the following R'-5β-cyano-A-norandrostane-2-one-17β-ol 2-ethylene ketals for the 17α-ethynyl-5β-cyano-A-norandrostane-2-one-17β - ol 2-ethylene ketal in the procedure of Example 2, the indicated R'-5β-cyano-A-norandrostane-2-one-17β-ol is formed.

| Example | Reactant R' is: | Product R' is: |
| --- | --- | --- |
| 12 | 17α-chloroethynyl | 17α-chloroethynyl. |
| 13 | 17β-chloroethynyl | 17β-chloroethynyl. |
| 14 | 17α-trifluorovinyl | 17α-trifluorovinyl. |
| 15 | 17α-β-chlorovinyl | 17α-β-chlorovinyl. |
| 16 | 17α-α,β-dichlorovinyl | 17α-α,β-dichlorovinyl. |
| 17 | 17α-α,β-difluorovinyl | 17α-α,β-difluorovinyl. |

EXAMPLE 18

17α-trifluoropropynyl-5β-cyano-A-norandrostane-2-one-17β-ol acetate

Following the procedure of Example 3, but substituting an equivalent amount of 17α-trifluoropropynyl-5β-cyano-A-norandrostane-2-one-17β-ol for the 17α-ethynyl-5β-cyano-A-norandrostane-2-one-17β-ol, there is obtained 17α - trifluoropropynyl-5β-cyano-A-norandrostane-2-one-17β-ol acetate.

EXAMPLE 19

17α-ethynyl-5β-norandrostane-2-one-17β-ol

Following the procedure in Example 1, step (d), but substituting 5β-A-norandrostane-2,17-dione for 5β-cyano-A-norandrostane-2,17-dione 2-ethylene ketal, there is obtained 17α-ethynyl-5β-A-norandrostane-2-one-17β-ol, λ KBr 2.91, 3.03 and 5.78μ.

EXAMPLE 20

17α-trifluoropropynyl-5β-A-norandrostane-2-one-17β-ol

Following the procedure in Example 4, but substituting 5β-A-norandrostane-2,17-dione for 5β-cyano-A-norandrostane-2,17-dione 2-ethylene ketal, there is obtained 17α-trifluoropropynyl-5β-A-norandrostane-2-one-17β-ol.

EXAMPLE 21

17α- and 17β-chloroethynyl-5β-A-norandrostane-2-one-17-ols

Following the procedure in Example 5, but substituting 5β-A-norandrostane-2,17-dione for 5-cyano-A-norandrostane-2,17-dione 2-ethylene ketal, there is obtained a mixture of 17α- and 17β-chloroethynyl-5β-A-norandrostane-2-one-17-ols.

EXAMPLE 22

17α-trifluorovinyl-5β-A-norandrostane-2-one-17β-ol

Following the procedure in Example 6, but substituting 5β-A-norandrostane-2,17-dione for 5β-cyano-A-norandrostane-2,17-dione 2-ethylene ketal, there is obtained 17α-trifluorovinyl-5β-A-norandrostane-2-one-17β-ol.

EXAMPLE 23

17α-trifluoropropenyl-5β-A-norandrostane-2-one-17β-ol

Hydrogenation of 17-trifluoropropynyl-5β-A-norandrostane-2-one-17β-ol at 45 p.s.i. with Lindlar catalyst gives 17α-trifluoropropenyl-5β-A-norandrostane-2-one.

EXAMPLE 24

17α-ethynyl-5β-A-norandrostane-2-one-17β-ol acetate

Following the procedure of Example 3, but substituting 17α-ethynyl-5β-A-norandrostane - 2 - one-17β-ol for the 17α-ethynyl-5β-cyano-A-norandrostane-2-one-17β-ol, there is obtained 17α-ethynyl-5β-A-norandrostane-2-one-17β-ol acetate.

Similarly, the 17-free alcohols of Examples 20 through 23 can be converted to their acetate derivatives.

EXAMPLE 25

Following the procedure of Example 3 but substituting propionic anhydride for acetic anyhdride there is obtained the 17α - ethynyl-5β-cyano-A-norandrostane-2-one-17β-ol propionate.

EXAMPLE 26

Following the procedure of Example 3 but substituting hexanoyl chloride for acetic anhydride there is obtained the 17α - ethynyl-5β-cyano-A-norandrostane-2-one-17β-ol hexanoate.

EXAMPLE 27

Following the procedure of Example 3 but substituting decanoyl chloride for acetic anhydride there is obtained the 17α - ethynyl - 5β-cyano-A-norandrostane-2-one-17-ol decanoate.

EXAMPLE 28

Following the procedure of Example 3 but substituting benzoyl chloride for acetic anhydride there is obtained the 17α-ethynyl-5β-cyano-A-norandrostane-2 - one - 17β - ol benzoate.

EXAMPLE 29

Following the procedure of Example 3 but substituting naphthoyl chloride for the acetic anhydride there is obtained the 17α-ethynyl-5β-cyano-A-norandrostane-2-one-17β-ol naphthanoate.

EXAMPLE 30

Following the procedure of Example 3 but substituting cyclohexylcarbonyl chloride for the acetic anhydride there is obtained the 17α-ethynyl-5β-cyano-A-norandrostane-2-one-17β-ol cyclohexylcarbonate.

EXAMPLE 31

Following the procedure of Example 3 but substituting cyclopentenylcarbonyl chloride for the acetic anhydride there is obtained the 17α-ethynyl-5β-cyano-A-norandrostane-2-one-17β-ol cyclopentenylcarbanoate.

EXAMPLE 32

Following the procedure of Example 3 but substituting phenylacetyl chloride for the acetic anhydride there is obtained the 17α-ethynyl-5β-cyano-A-norandrostane-2-one-17β-ol phenyl acetate.

EXAMPLE 33

Following the procedure of Example 3 but substituting β-phenylpropionic acid chloride for the acetic anhydride there is obtained the 17α-ethynyl-5β-cyano-A-norandrostane-2-one-17β-ol β-phenylpropionate.

What is claimed is:
1. A compound of the formula

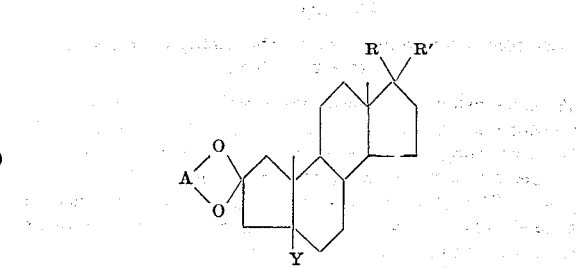

wherein Y is selected from the group consisting of β-hydrogen and β-cyano; R is hydroxy or acyloxy of a hydrocarbon carboxylic acid of less than twelve carbons; R' is selected from the group consisting of vinyl, ethynyl, halo substituted vinyl, trifluoromethyl substituted vinyl, halo substituted ethynyl and trifluoromethyl substituted ethynyl; and A is ethylene or propylene.

2. A compound of claim 1 having the name 17α-ethynyl-5β-cyano-A-norandrostane-2-one-17β-ol-2-ethylene ketal.

3. A compound of claim 1 having the name 17α-trifluoropropynyl-5β-cyano-A-norandrostane-2-one-17β-ol 2-ethylene ketal.

4. A compound of claim 1 having the name 17α-chloroethynyl-5β-cyano-A-norandrostane-2-one - 17β - ol  2-ethylene ketal.

5. A compound of claim 1 having the name 17β-chloroethynyl-5β-cyano-A-norandrostane-2-one-17α-ol - 2 - ethylene ketal.

6. A compound of claim 1 having the name 17α-trifluorovinyl-5β-cyano-A-norandrostane-2-one - 17β - ol  2-ethylene ketal.

7. A compound of claim 1 having the name 5β-cyano-A-norandrostane-2-one-17β-ol 2-ethylene ketal 17-acetate.

8. A compound of claim 1 having the name 5β-cyano-A-norandrostane-2-one-17β-ol 2-ethylene ketal.

9. A compound of claim 1 having the name 5β-cyano-A-norandrostane-2,17-dione 2-ethylene ketal.

References Cited
UNITED STATES PATENTS 3,271,437    9/1966   Levine et al. _____ 260—464

ALEX MAZEL, Primary Examiner

J. H. TURNIPSEED, Assistant Examiner

U.S. Cl. X.R.

260—340.7, 464, 469, 176, 488, 586; 424—278

K424c

PO-1050
(5/69)

UNITED STATES PATENT OFFICE
CERTIFICATE OF CORRECTION

Patent No. 3,647,820          Dated  March 7, 1972

Inventor(s) Seymour D. Levine and Patrick A. Diassi

It is certified that error appears in the above-identified patent and that said Letters Patent are hereby corrected as shown below:

Column 3, line 46, "(mm.," should read -- (m., --.
Column 6, line 47, "5-cyano" should read -- 5β-cyano --; and on line 61, "17-trifluoropropynyl" should read -- 17α-trifluoropropynyl --. Column 7, line 17, "17-ol" should read -- 17β-ol --.

Signed and sealed this 27th day of June 1972.

(SEAL)
Attest:

EDWARD M. FLETCHER, JR.
Attesting Officer

ROBERT GOTTSCHALK
Commissioner of Patents